United States Patent
Liu

(10) Patent No.: US 9,826,417 B2
(45) Date of Patent: Nov. 21, 2017

(54) MBMS SERVICE RECEPTION AND ABILITY TRANSMISSION METHOD AND DEVICE

(71) Applicant: CHINA ACADEMY OF TELECOMMUNICATIONS TECHNOLOGY, Beijing (CN)

(72) Inventor: Jiamin Liu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 72 days.

(21) Appl. No.: 14/375,462

(22) PCT Filed: Jan. 28, 2013

(86) PCT No.: PCT/CN2013/071031
§ 371 (c)(1),
(2) Date: Jul. 30, 2014

(87) PCT Pub. No.: WO2013/113268
PCT Pub. Date: Aug. 8, 2013

(65) Prior Publication Data
US 2015/0023243 A1   Jan. 22, 2015

(30) Foreign Application Priority Data

Jan. 30, 2012 (CN) .......................... 2012 1 0020923

(51) Int. Cl.
*H04W 24/02*     (2009.01)
*H04W 4/06*     (2009.01)
(Continued)

(52) U.S. Cl.
CPC .......... *H04W 24/02* (2013.01); *H04L 12/189* (2013.01); *H04L 51/38* (2013.01); *H04L 65/605* (2013.01);
(Continued)

(58) Field of Classification Search
CPC ..... H04W 24/02; H04W 76/002; H04W 4/06; H04L 12/189; H04L 65/605; H04L 51/38; H04N 21/6371
See application file for complete search history.

(56) References Cited

U.S. PATENT DOCUMENTS

2007/0136759 A1* 6/2007 Zhang ................ H04N 7/17318
                                                                        725/62
2010/0061285 A1* 3/2010 Maeda .................... H04W 4/06
                                                                        370/312
(Continued)

FOREIGN PATENT DOCUMENTS

CN          1798063 A         7/2006
CN        102137430 A         7/2011
(Continued)

OTHER PUBLICATIONS

International Search Report dated May 2, 2013 re: PCT/CN2013/071031; citing: CN 102572713 A, CN 102378113 A and CN 1798063 A.
(Continued)

*Primary Examiner* — Khaled Kassim
*Assistant Examiner* — Zhaohui Yang
(74) *Attorney, Agent, or Firm* — Cantor Colburn LLP

(57) ABSTRACT

The present disclosure discloses an MBMS service reception and capability transmission method and device. In this method, the terminal device may send the information of the MBMS service of interest of the terminal device or the information of the MBMS service, which is being received, to the network device and the MBMS service reception capability information of the terminal device via a message. If an MBMS frequency point corresponding to the MBMS service of interest of the terminal device or the MBMS frequency point corresponding to the MBMS service, which is being received, is within a reception capability scope of
(Continued)

the terminal device in a current configuration, the message reported by the terminal device to the network device includes: the MBMS frequency point.

16 Claims, 5 Drawing Sheets

(51) Int. Cl.

| | | |
|---|---|---|
| H04W 76/00 | (2009.01) | |
| H04L 12/18 | (2006.01) | |
| H04L 29/06 | (2006.01) | |
| H04N 21/442 | (2011.01) | |
| H04N 21/6371 | (2011.01) | |
| H04N 21/6405 | (2011.01) | |
| H04N 21/647 | (2011.01) | |
| H04W 4/00 | (2009.01) | |
| H04L 12/58 | (2006.01) | |
| H04W 8/24 | (2009.01) | |

(52) U.S. Cl.
CPC ... *H04N 21/44209* (2013.01); *H04N 21/6371* (2013.01); *H04N 21/6405* (2013.01); *H04N 21/64738* (2013.01); *H04W 4/00* (2013.01); *H04W 4/06* (2013.01); *H04W 76/002* (2013.01); *H04W 8/24* (2013.01)

(56) References Cited

U.S. PATENT DOCUMENTS

| | | | | |
|---|---|---|---|---|
| 2010/0113030 | A1* | 5/2010 | Kanazawa | H04J 11/0093 455/437 |
| 2010/0272004 | A1* | 10/2010 | Maeda | H04L 5/0007 370/312 |
| 2012/0236776 | A1* | 9/2012 | Zhang | H04W 48/12 370/312 |
| 2013/0039250 | A1* | 2/2013 | Hsu | H04H 20/71 370/312 |
| 2013/0064162 | A1* | 3/2013 | Phan | H04W 72/005 370/312 |
| 2013/0083715 | A1* | 4/2013 | Etemad | H04W 52/04 370/312 |

FOREIGN PATENT DOCUMENTS

| | | |
|---|---|---|
| CN | 102378113 A | 3/2012 |
| CN | 102572713 A | 7/2012 |

OTHER PUBLICATIONS

Catt "MBMS Service Continuity in RRC-Connected Mode", 3GPP TSG RAN WG2 Meeting #76 R2-115796 Nov. 14-18, 2011, San Diego, CA USA.
CN Office Action issued Jan. 27, 2014 re: Application No. 201210020923.4, pp. 1-35.
EP Office Action issued Sep. 28, 2015 re; Application No. 13743636.6, pp. 1-8.
EP Search Report issued Dec. 3, 2014 re: Application No. PCT/CN2013/071031, pp. 1-11.
Ericsson "MBMS Service Continuity in Connected Mode", 3GPP TSG-RAN WG2 #75, R2-114481, Aug. 22-26, 2011, Athens Greece, pp. 1-4.
Huawei "Stage 2 agreements on service continuity and location for MBMS for LTE", 3GPP TSG-RAN WG2 Meeting #76, R2-116259, Nov. 14-18, 2011 San Francisco USA, pp. 1-4.
KR Office Action issued Oct. 16, 2015 re: Application No. 10-2014-7024176, pp. 1-7.
LTE Evolved Universal Terrestrial Radio Access (E-Utra); Radio Resource Control (RRC); Protocol Specification; ETSI; 3GPP TS 36.331 Version 10.4.0 release 10, Jan. 2010, pp. 1-300.
MediaTek Inc. "Service continuity and location information for MBMS", 3GPP TSG-RAN WG2 Meeting #73bis, R2-112040, Apr. 11-15, 2011, Shanghai China, pp. 1-4.

\* cited by examiner

MBMS SERVICE RECEPTION AND ABILITY TRANSMISSION METHOD AND DEVICE

This application is a national phase of International Application No. PCT/CN2013/071031, filed on Jan. 28, 2013, which claims priority to Chinese patent application No. 201210020923.4, filed on Jan. 30, 2012, the content of which are incorporated herein by reference in their entirety.

FIELD OF THE INVENTION

The present disclosure relates to a wireless communication field, and more particularly to a Multimedia Broadcast Multicast Service (MBMS) service reception and ability transmission method and device.

BACKGROUND

MBMS provides users in a radio cell with a multimedia broadcast and multicast service. The current Long Term Evolution (LTE) system supports providing an MBMS service on a frequency layer shared by the MBMS and a unicast service. A cell on the frequency layer is an MBMS/unicast hybrid cell. The frequency layer providing the MBMS service is called an MBMS frequency layer. On the MBMS frequency layer, the MBMS service may use a Multicast Broadcast Single Frequency Network (MBSFN) transmission mode.

SUMMARY

Embodiments of the present disclosure provide an MBMS service reception and ability transmission method and device, to solve a problem that content reported with the conventional MBMS service information reporting scheme is not comprehensive and ensure the reception continuity of the MBMS service of the terminal device.

An example of the present disclosure provides an MBMS service reception and ability information reporting method. The method includes:

sending, by a terminal device, information of an MBMS service of interest of the terminal device or information of an MBMS service, which is being received by the terminal device, and MBMS service reception ability information of the terminal device to a network device; wherein sending, by the terminal device, the information of the MBMS service of interest of the terminal device or the information of the MBMS service, which is being received by the terminal device, and the MBMS service reception ability information of the terminal device to the network device comprises:

sending, by the terminal device, the information of the MBMS service and the MBMS service reception ability information to the network device via reporting a message to the network device;

if an MBMS frequency point corresponding to the MBMS service of interest of the terminal device or the MBMS frequency point corresponding to the MBMS service, which is being received, is within a reception ability scope of the terminal device in a current configuration, the message reported by the terminal device to the network device comprises: the MBMS frequency point.

Another example of the present disclosure provides a method based on the above MBMS service reception and ability information reporting method. The method includes:

receiving, by a network device, information of an MBMS service of interest of a terminal device or information of an MBMS service, which is being received by the terminal device, and MBMS service reception ability information of the terminal device from the terminal device; and performing, by the network device, corresponding processing according to the received information of the MBMS service and the MBMS service reception ability information of the terminal device;

wherein receiving, by the network device, the information of the MBMS service of interest of the terminal device or the information of the MBMS service, which is being received by the terminal device, and the MBMS service reception ability information of the terminal device from the terminal device comprises:

receiving, by the network device, the information of the MBMS service and the MBMS service reception ability information from the terminal device via a message;

if an MBMS frequency point corresponding to the MBMS service of interest of the terminal device or the MBMS frequency point corresponding to the MBMS service, which is being received, is within a reception ability scope of the terminal device in a current configuration, the message comprises: the MBMS frequency point.

Another example of the present disclosure provides a terminal device, including:

a transmission module, to send information of a Multimedia Broadcast Multicast Service (MBMS) service of interest of the terminal device or information of an MBMS service, which is being received, and MBMS service reception ability information of the terminal device to a network device; wherein the transmission module is further to report a message to the network device to send the information of the MBMS service and the MBMS service reception ability information to the network device;

if an MBMS frequency point corresponding to the MBMS service of interest of the terminal device or the MBMS frequency point corresponding to the MBMS service, which is being received, is within a reception ability scope of the terminal device in a current configuration, the message reported by the transmission module to the network device comprises: the MBMS frequency point.

Another example of the present disclosure provides a network device, including:

a reception module, to receive information of an MBMS service of interest of a terminal device or information of an MBMS service, which is being received by the terminal device, and MBMS service reception ability information of the terminal device from the terminal device; and a processing module, to perform corresponding processing according to the received information of the MBMS service and the MBMS service reception ability information of the terminal device; wherein the reception module is further to receive the information of the MBMS service and the MBMS service reception ability information from the terminal device via a message;

if an MBMS frequency point corresponding to the MBMS service of interest of the terminal device or the MBMS frequency point corresponding to the MBMS service, which is being received, is within a reception ability scope of the terminal device in a current configuration, the message comprises: the MBMS frequency point.

With the above embodiments of the present disclosure, the network device may perform the processing according to the MBMS service reception ability of the terminal device via reporting the MBMS service reception ability information of the terminal device to the network device to ensure the reception continuity of the MBMS service of the terminal device.

DETAILED DESCRIPTION

The MBSFN refers to perform synchronous transmission on multiple cells with the same frequency at the same time (That is, cells in a same MBSFN area work on a same frequency). Frequency resources may be saved and spectrum efficiency may be enhanced with this kind of transmission mode. With this transmission mode, it is required that the multiple cells should transmit same content at the same time. Therefore, a User Equipment (UE) receiver may treat multiple MBSFN cells as a big cell. Therefore, the UE not only cannot be interrupted by inter-cell interference caused by neighbor cell transmission, but also can benefit from superposition of signals from multiple MBSFN cells. Furthermore, if advanced UE receiver technologies are used, a time lag problem of multi-path propagation may be solved and intra-cell interference may be cancelled. A diversity effect caused by co-frequency transmission of the multiple cells may solve problems, such as coverage of holes, enhance reliability of receiving and improve coverage.

Technical characteristics of MBMS multi-cell transmission are that the MBMS services in the MBSFN area may be synchronously transmitted, multi-cell MBMS transmission may be merged and an MBSFN synchronous area may be semi-statically configured, such as may be configured via an Operation and Management (O&M) system.

Figure 1:
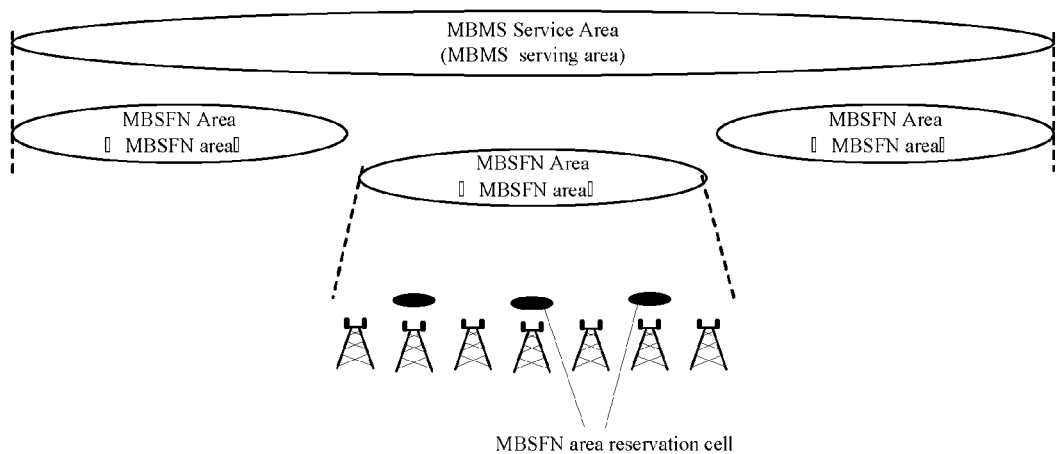
FIG. 1 is a diagram illustrating a corresponding relationship between an MBMS service area and MBSFN areas.

FIG. 1 illustrates a corresponding relationship between an MBMS service area and MBSFN areas. The MBMS service area is distinguished by one or multiple service IDs. Each ID is mapped into one or multiple cells. The MBSFN area consists of a group of cells in a synchronization area. These cells perform synchronous MBSFN transmission. The MBSFN areas are planed according to strategies of an operator. An MBSFN area reserved cell also belongs to a synchronization area and the MBSFN area reserved cell cannot perform MBSFN transmission.

In LTE Rel-11, it may be permitted that multiple frequency layers simultaneously provide MBMS services. However, in the same location, generally, one service is transmitted via only one MBMS frequency layer. Service continuity of the MBMS service is ensured in only one MBSFN area. That is, the continuity is ensured in only one frequency layer. The service continuity between different frequencies or the service continuity of different frequencies is not taken into consideration for the moment. As for a UE in a connected state, in order to ensure the service continuity of the UE, the UE may need to report its latest MBMS service reception or state of interest to a network and the network tries to ensure reception continuity of the MBMS service.

The conventional method only defines that the UE needs to report its latest frequency point of an MBMS service of interest or an MBMS service, which is being received in real time. The network side cannot adequately command ability of the UE and reception situation only via the frequency point of the MBMS service of interest or the MBMS service, which is being received. The network side cannot perform correct service cell configuration for the UE, which is not good for the user's experiences. For instance, if the UE reports an MBMS frequency point of interest or an MBMS frequency point being received and the frequency point is a non-service frequency point, the UE with strong reception ability may directly receive the MBMS service in the current confirmation. However, as for the UE with poor reception ability (only can receive the MBMS service on the Primary cell (Pcell)), the UE cannot directly receive the MBMS service in the current configuration and may perform reception after the network side re-configures the service cell.

Embodiments of the present disclosure may be described in detail accompanying with drawings and examples.

As for problem in the conventional method, an information reporting scheme of an MBMS service of a UE may be improved in the embodiments of the present disclosure. In embodiments of the present disclosure, the UE may report received MBMS information or MBMS information of interest to a network side and inform the network side of whether the MBMS service of interest or a frequency point is in a receiving ability scope of the UE. If the frequency point corresponding to the MBMS service of interest is beyond the reception ability of the current configuration, i.e. the UE does not have the ability to receive the frequency point corresponding to the MBMS service of interest, the network side may re-configure a serving cell of the UE according to load and algorithm to ensure reception continuity of the MBMS service of the user.

MBMS service reception and ability reporting methods provided by embodiments of the present disclosure may be as follows.

Method one: as for an MBMS frequency point, which is being received, and/or information of an MBMS service, which is being received, or the MBMS frequency point and/or information of the MBMS service of interest, the UE may report reception ability information with a mode associated with reception ability.

One implementation method may be that a terminal device may report the MBMS frequency point and an optional instruction. Length of the optional instruction is 1 bit. If 1 bit instruction is carried, it may indicate that the UE may be interested in the MBMS frequency point but may not have the ability to receive the MBMS frequency point with the current configuration. If the 1 bit instruction is not carried, it may indicate that the UE may directly receive or is receiving the MBMS service of the frequency point with the current configuration.

Another implementation method may be that the terminal device may report the MBMS frequency point and/or other identifier information corresponding to the MBMS service. The MBMS frequency point may denote that the UE may directly receive its MBMS services with the current configuration. The other identifier information may denote that the UE cannot receive the corresponding MBMS service with the current configuration. The other identifier information may be a service ID, a service area ID or a cell ID bearing the service, etc.

In the above method one, the MBMS service reception ability may be whether the UE may receive the MBMS service corresponding to the MBMS frequency point reported by the UE with the current configuration. That is, the MBMS service reception ability may refer to whether the MBMS frequency point corresponding to the MBMS service, which is being received, or the MBMS service of interest is within the reception ability scope of the UE with the current configuration. MBMS service reception ability information may be sent to the network side in an explicit mode or an implicit mode.

Method two: The UE may separately report a reception ability of the MBMS service, i.e. the MBMS service reception ability.

One implementation method may be that the UE may report the MBMS service reception ability via an independent process or a network triggering process.

In the above method two, the MBMS service reception ability may be associated with the cell. The MBMS service reception ability information reported by the UE may include one or combination of following content.

i) The UE can receive the MBMS service on the Pcell.

ii) The UE may receive the MBMS service on any serving cell.

iii) The UE may receive the MBMS service in an aggregation ability scope.

iv) The UE may receive the MBMS service on any carrier (for instance, a separate MBMS receiver).

v) The UE may simultaneously receive the MBMS services on multiple carriers, etc.

The above two methods for reporting the MBMS service reception and ability information provided in the above embodiments may be described hereinafter in detail accompanying with drawings.

This embodiment may take the LTE system for example and describe a flow for the UE to report MBMS service reception and ability information via an MBMS frequency point and 1 bit optional instruction and a processing flow of the network side.

Figure 2:
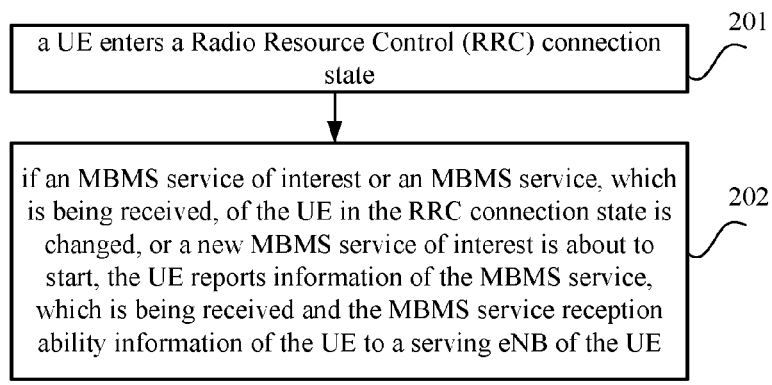
FIG. 2 is a flow chart illustrating an MBMS reception and ability reporting flow of a UE side in accordance with various embodiments of the present disclosure.

Referring to FIG. 2, FIG. 2 is a flow chart illustrating processing of a UE side in accordance with various embodiment of the present disclosure.

In block 201, a UE may enter a Radio Resource Control (RRC) connection state. If the UE is in the RRC connection state, this step may be omitted.

In block 202, if an MBMS service of interest or an MBMS service, which is being received, of the UE in the RRC connection state is changed, or a new MBMS service of interest is about to start, the UE may report information of the MBMS service, which is being received (or information of the MBMS service of interest) and the MBMS service reception ability information of the UE to a serving eNB (station) of the UE. According to an example, the UE may generate an RRC message to report the information of the MBMS service, which is being received or the information of the MBMS service of interest to the serving eNB of the UE to indicate an MBMS service reception ability of the UE.

Then, the UE may receive an MBMS service in accordance with specific conditions. The specific conditions may be as follows.

i) If an MBMS frequency point reported by the UE is in a reception ability scope of the UE, the UE may receive a service on an MBMS frequency point of interest.

ii) If the MBMS frequency point reported by the UE is beyond the reception ability scope of the UE, the UE may wait for the network to re-configure a serving cell of the UE and the UE may receive the MBMS service on the MBMS frequency point.

iii) In a state that the MBMS frequency point reported by the UE is beyond the reception ability scope of the UE and the network side cannot change the serving cell of the UE to receive the MBMS service due to MBMS frequency point congestion, etc., if a message reported by the UE indicates that the MBMS service has a high priority, the network side may release a unicast service and the UE may enter an IDLE state to receive the MBMS service. If the message reported by the UE indicates that the unicast service has a high priority, the UE may continue to receive the unicast service. If the MBMS service reception state or the MBMS service interest state is not changed, the above reporting may be maintained (which is considered after the MBMS frequency point congestion is removed or when the handover is performed). If the MBMS service reception state or the MBMS service interest state is changed, the reporting may continue according to the flow shown in FIG. 2.

In the block 202 of the above flow, the reporting of the message may follow following rules.

i) If the frequency point corresponding to the latest MBMS service of interest may be directly received by the UE, the message reported by the UE may include information of the MBMS frequency point and may not include the 1 bit instruction corresponding to the MBMS frequency point. In another example, the message reported by the UE may include the information of the MBMS frequency point and the 1 bit instruction. The value of the 1 bit instruction may indicate that the MBMS frequency point is in within the reception ability of the UE.

ii) If the frequency point corresponding to the latest MBMS service of interest may not be directly received by the UE, the message reported by the UE not only includes the MBMS frequency point information, but also includes the corresponding 1 bit instruction. The instruction may correspond to the MBMS frequency point information and indicate that the MBMS frequency point is beyond the current reception ability of the UE.

On this basis, the reported message may further follow one of or combination of following rules.

iii) The MBMS frequency point in the reported message cannot exceed an MBMS frequency point scope which may be simultaneously received by the UE. For instance, if the UE can receive one MBMS frequency point, the message reported by the UE cannot include two MBMS frequency points.

iv) The priority of each MBMS frequency point may be respectively processed and priorities may be displayed via a mode for setting priorities of the MBMS frequency points or via a sorting mode (such as, an MBMS frequency point ranked in the front may have the high priority.) Furthermore, when the number of the MBMS frequency points of interest is larger than the number of the MBMS frequency points supported and received by the UE, the UE may not report the MBMS frequency point with low priority and report the MBMS frequency point with the relatively high priority.

In the step 202 of the above flow, as for trigger time for reporting the message, rules may be as follows.

i) If the UE is viewing and selecting the MBMS service being transmitted on an air interface, the UE may report the message to the eNB after waiting for stable reception time. For instance, after the UE receives the MBMS service on an F1 frequency point for length of time T, the UE may report the message to the eNB. The value of T may be configured by the network or UE or may be a default value. Furthermore, during the waiting time T, if the measurement and reporting needs to be performed, the UE may immediately report MBMS service reception state information.

ii) If an MBMS service is a customized or automatically-received MBMS service (That is, the UE obtains that a user is interested in an MBMS service which is to be transmitted on the air interface), the UE may report the MBMS service reception state and ability information to the network at a moment, which is time T before the starting moment of the MBMS service. The value of T may be configured by the network or the UE or may be a default value. Furthermore, as for the frequency point corresponding to the MBMS service, which is in the reception ability of the UE, and the frequency point corresponding to the MBMS service, which is beyond the reception ability of the UE, the values of the T may be different. Generally, if the frequency point corresponding to the MBMS service is beyond the reception ability of the UE, a larger value is set for T to reserve sufficient time to transform the current serving cell.

It should be noted that when a relationship between the MBMS frequency point of interest of the UE and the reception ability changes, since the network side possesses corresponding information, triggering of a new MBMS service reception state reporting process may not be needed. For instance, the MBMS frequency point reported by the UE is F1 and the frequency point of the current unicast connection is F2, after the network modifies a serving frequency point of the UE as the F1, the UE may not need to re-report the MBMS service reception state message to inform the network that the frequency point F1 is within the ability scope of the UE. As for the situation that the MBMS frequency point of interest is beyond the ability scope of the UE, the network side may determine that the UE may be interested in the MBMS frequency point, whether the network side changes the serving cell for the UE or not in the subsequent processing. When the frequency point of interest changes or other changes occur, the MBMS service reception state may be reported again. That is, separate change of the reception ability of the MBMS frequency point (That is, change of the MBMS service reception ability caused by change of the serving cell on the premise that the MBMS frequency point of interest is not changed) may not need to be reported to the network side.

Figure 3:
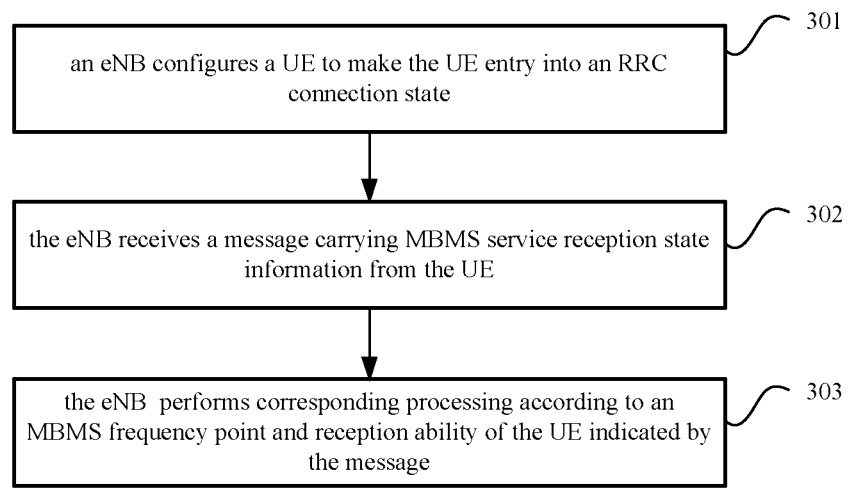
FIG. 3 is a flow chart illustrating an MBMS reception and ability reporting flow of an eNB side in accordance with various embodiments of the present disclosure.

Referring to FIG. 3, FIG. 3 is a flow chart illustrating processing of the eNB side in accordance with various embodiment of the present disclosure. The flow may include following blocks.

In block 301, an eNB may configure a UE to make the UE entry into an RRC connection state. If the UE is already in the RRC connection state, this block may be omitted.

In block 302, the eNB may receive a message carrying MBMS service reception state information from the UE.

In block 303, the eNB may perform corresponding processing according to an MBMS frequency point and reception ability of the UE indicated by the message, which may include following situations.

i) If the eNB obtains that the MBMS frequency point reported by the UE is within the reception ability scope of the UE according to a display indication in the message, the eNB may not need to do any re-configuration operation and need to record MBMS frequency point information of interest of the UE, so that the MBMS frequency point information of interest of the UE may be used as a reference for selecting a serving cell in the next block to ensure reception continuity of the MBMS service of the UE.

ii) If the eNB obtains that the MBMS frequency point reported by the UE is beyond the reception ability scope of the UE according to the display indication in the message, the UE may be permitted to change the serving cell according to load and an algorithm of the network side. For instance, the Pcell of the UE may be switched to a frequency point, at which the MBMS service may be located to receive the unicast service and MBMS service. The serving cell of the UE may be re-configured and the MBMS frequency point information of interest of the UE may be recorded.

iii) If the eNB obtains that the MBMS frequency point reported by the UE is beyond the reception ability scope of the UE according to the display indication in the message, the UE may not be permitted to change the expected serving cell according to the load and algorithm of the network side. For instance, if the MBMS frequency point congests, it may not be ensured that the unicast service and MBMS service may be received. In this situation, if it is obtained that priority of the MBMS service is high according to the message reported by the UE, the network side may release the unicast service and the UE may enter an IDLE state to receive the MBMS service. If it is obtained that the priority of the unicast service is high according to the message reported by the UE, the network side may record the MBMS frequency point information of interest of the UE. After the MBMS frequency point congestion is removed, a handover operation is performed on the UE or reception state information of the UE is changed, the reception continuity of the MBMS service may be considered and corresponding processing may be performed according to the recorded MBMS frequency point information of interest of the UE and the reception ability of the UE.

This embodiment may take the LTE system for example and describe a flow for the UE to report MBMS service reception and ability information via an MBMS frequency point and/or other IDs corresponding to an MBMS service and a corresponding processing flow of the network side.

Figure 4:
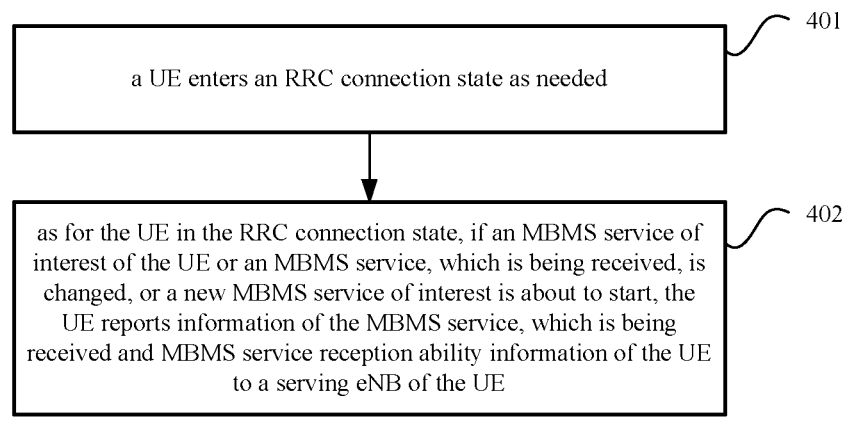
FIG. 4 is a flow chart illustrating an MBMS reception and ability reporting flow of a UE side in accordance with various embodiments of the present disclosure.

Referring to FIG. 4, FIG. 4 is a flow chart illustrating processing of a UE side in accordance with various embodiments of the present disclosure. The flow may include following blocks.

In block 401, a UE may enter an RRC connection state. If the UE is already in the RRC connection state, this block may be omitted.

In block 402, as for the UE in the RRC connection state, if an MBMS service of interest of the UE or an MBMS service, which is being received, is changed, or a new MBMS service of interest is about to start, the UE may report information of the MBMS service, which is being received (or information of the MBMS service of interest) and MBMS service reception ability information of the UE to a serving eNB of the UE. In an example, the UE may generate an RRC message to report the information of the MBMS service of interest or the information of the MBMS service, which is being received, to the serving eNB of the UE to indicate an MBMS service reception ability of the UE.

The UE may receive the MBMS service in accordance with specific conditions. The specific conditions may be as follows.

i) If the MBMS frequency point reported by the UE is within the reception ability scope of the UE, the UE may receive a service on the MBMS frequency point of interest.

ii) If the MBMS frequency point reported by the UE is beyond the reception ability scope of the UE, the UE may wait for the network to re-configure a serving cell of the UE and receive the MBMS service on the MBMS frequency point after the reconfiguration is finished.

iii) In a situation that the MBMS frequency point reported by the UE is beyond the reception ability scope of the UE and the network side cannot change the serving cell of the UE to receive the MBMS service due to MBMS frequency point congestion, etc., if a message reported by the UE indicates that the MBMS service has a high priority, the network side may release a unicast service and the UE may enter an IDLE state to receive the MBMS service. If the message reported by the UE indicates that the unicast service has a high priority, the UE may continue to receive the unicast service. If the MBMS service reception state or the MBMS service interest state is not changed, the above reporting may be maintained (which is considered after the MBMS frequency point congestion is removed or when the handover is performed). If the MBMS service reception state or the MBMS service interest state is changed, the reporting may continue according to the flow shown in FIG. 4.

In the block 402 of the above flow, the reporting of the message may follow following rules.

i) If the frequency point corresponding to the latest MBMS service of interest may be directly received by the UE, the message reported by the UE may include the MBMS frequency point information.

ii) If the frequency point corresponding to the latest MBMS service of interest may not be directly received by the UE, the UE may not be able to obtain the MBMS frequency point, at which the service of interest may be located, and the UE may report the MBMS service of interest via one of following three methods.

Method 1: The UE may report an ID of an MBMS service of interest, i.e. a service ID.

Method 2: The UE may report an MBMS service area ID, to which the MBMS service may belong.

Method three: If the UE may obtain other information of the MBMS service of interest, such as a cell ID from a cell, from which a system message may be read, the UE may report the other information, such as the cell ID.

On this basis, the reported message may further follow one of or combination of following rules.

iii) The MBMS frequency point in the reported message cannot exceed an MBMS frequency point scope which may be simultaneously received by the UE. For instance, if the UE can receive one MBMS frequency point, the message reported by the UE cannot include two pieces of MBMS service information (such as the MBMS frequency point and/or other IDs of the MBMS service). As for a situation that the UE cannot obtain MBMS frequency point information of a service of interest of the UE, the UE may determine whether the current information exceeds the MBMS frequency point scope which may be simultaneously received.

iv) The priority of the MBMS service of interest may be processed and priorities may be displayed via a mode for setting priorities of the MBMS services or via a sorting mode. Furthermore, when the number of the frequency points of the MBMS services of interest is larger than the number of the MBMS frequency points supported and received by the UE, the UE may not report the MBMS service with low priority and report the MBMS service with the relatively high priority.

As for the trigger time for reporting the message by the UE in the step 402, the rules are same as those in embodiment one, which are not repeated here.

It should be noted that when a relationship between the MBMS frequency point of interest of the UE (or the MBMS service) and the reception ability changes, since the network side possesses the corresponding information, triggering of a new MBMS service reception state reporting process may not be needed. As for the situation that the MBMS service of interest is beyond the ability scope of the UE, the network side may determine that the UE may be interested in the MBMS frequency point corresponding to the service ID, service area ID or the cell ID, whether the network side changes the serving cell for the UE or not in the subsequent processing. When the frequency point of interest changes or other changes occur, the MBMS service reception state may be reported again. That is, separate change of the reception ability of the MBMS frequency point (That is, change of the reception ability of the UE on the premise that the MBMS service of interest is not changed) may not need to be reported to the network side.

Figure 5:
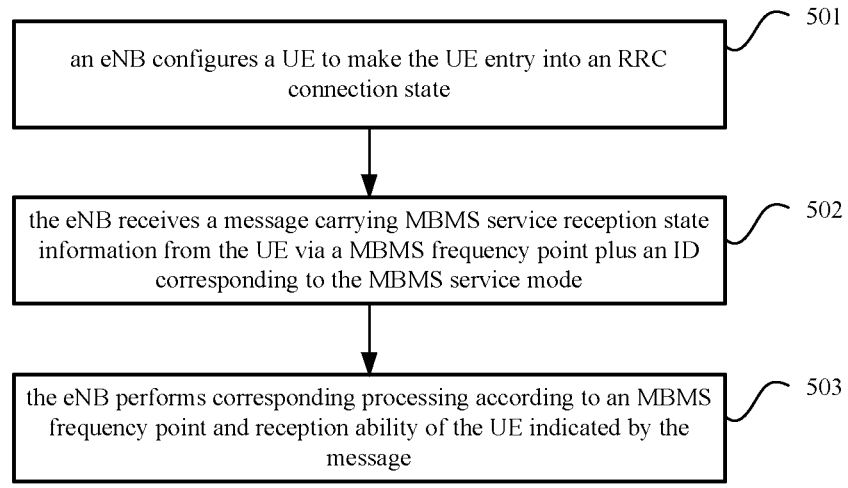
FIG. 5 is a flow chart illustrating an MBMS reception and ability reporting flow of an eNB side in accordance with various embodiments of the present disclosure.

Referring to FIG. 5, FIG. 5 is a flow chart illustrating processing of an eNB side in accordance with various embodiments of the present disclosure. The flow may include following blocks.

In block 501, an eNB may configure a UE to make the UE entry into an RRC connection state. If the UE is already in the RRC connection state, this block may be omitted.

In block 502, the eNB may receive a message carrying MBMS service reception state information from the UE.

In block 503, the eNB may perform corresponding processing according to an MBMS service and reception ability of the UE indicated by the message, which may include following situations.

i) If the eNB obtains that the MBMS frequency point reported by the UE is within the reception ability scope of the UE according to a display indication in the message, the eNB may not need to do any re-configuration operation and need to record the MBMS frequency point information of interest of the UE, so that the information of the MBMS frequency point of interest of the UE may be used as a reference for selecting a serving cell in the next block.

ii) If the eNB obtains that the frequency point corresponding to the MBMS service reported by the UE is beyond the reception ability scope of the UE according to the display indication in the message, the UE may be permitted to change the serving cell according to load and an algorithm of the network side. For instance, the Pcell of the UE may be switched to a frequency point, at which the MBMS service may be located, to simultaneously receive the unicast service and MBMS service. The serving cell of the UE may be re-configured and the MBMS frequency point information of interest of the UE may be recorded.

iii) If the eNB obtains that the frequency point corresponding to the MBMS service reported by the UE is beyond the reception ability scope of the UE according to the display indication in the message, the UE may not be permitted to change the expected serving cell according to the load and algorithm of the network side. For instance, if the MBMS frequency point congests, it may not be ensured that the unicast service and MBMS service may be received. In this situation, if it is obtained that priority of the MBMS service is high according to the message reported by the UE, the network side may release the unicast service and the UE may enter an IDLE state to receive the MBMS service. If it is obtained that the priority of the unicast service is high according to the message reported by the UE, the network side may record the MBMS frequency point information of interest of the UE. After the MBMS frequency point congestion is removed, a handover operation is performed on the UE or reception state information of the UE is changed, the reception continuity of the MBMS service may be considered and corresponding processing may be performed according to the recorded MBMS frequency point information of interest of the UE and the reception ability of the UE.

This embodiment may take the LTE system for example and describe a flow for the UE to separately report of MBMS service reception ability information and a corresponding processing flow of the network side.

Figure 6:
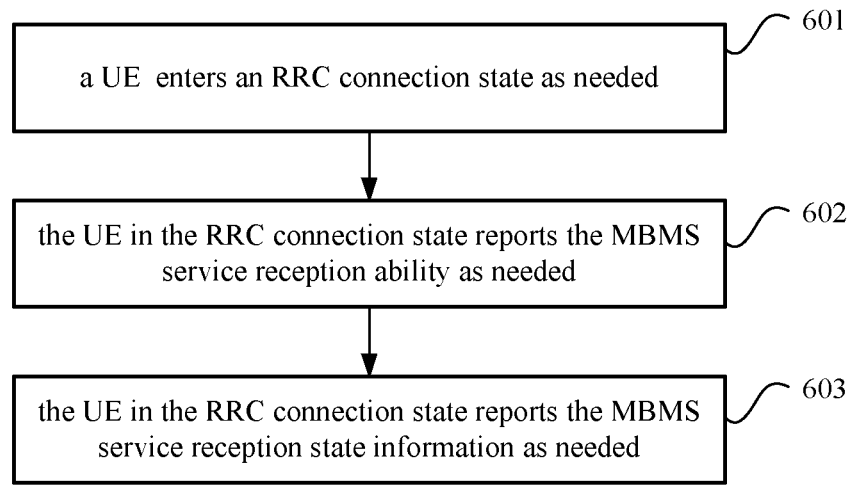
FIG. 6 is a flow chart illustrating an MBMS reception and ability reporting flow of a UE side in accordance with various embodiments of the present disclosure.

Referring to FIG. 6, FIG. 6 is a flow chart illustrating processing of a UE side in accordance with various embodiments of the present disclosure. The flow may include following blocks.

In block 601, a UE may enter an RRC connection state. If the UE is already in the RRC connection state, this block may be omitted.

In block 602, the UE in the RRC connection state may report the MBMS service reception ability.

In an example, a method for triggering the UE to report the MBMS service reception ability may be one of follows.

i) When the eNB performs conventional ability query, a response message from the UE may carry MBMS service reception ability information. A network switch control method may be adopted to determine whether to carry the MBMS service reception ability information. The network switch control method may include a network side implicit switch (For instance, a new domain may be added to a system message when designing a new continuous function of the MBMS service. The addition of the new domain may represent that the switch is turned on. The absence of the new domain may represent that the switch is turned off) or a network side explicit switch (For instance, 1 bit extra instruction in the system message may represent whether the eNB supports the processing of the MBMS ability reporting).

ii) A new eNB query process may be defined. That is, when the eNB queries the MBMS service reception ability, the UE may report the MBMS service reception ability information according to a query request.

iii) After the UE enters the RRC connection state and reports MBMS service reception state information for the first time, the MBMS service reception ability information may be carried via a reported message. Furthermore, after the UE is switched to a new cell, if the UE is configured as that the UE needs to report the MBMS service reception state information again, the MBMS service reception ability information may be carried in the reported message.

The MBMS service reception ability information reported by the UE may include bits for indicating a relationship between the serving cell of the UE and the MBMS service reception ability. For instance, one or multiple of following relationships may be indicated via one or some bits.

i) The UE may receive the MBMS service on the Pcell.

ii) The UE may receive the MBMS service on any serving cell.

iii) The UE may receive the MBMS service in an aggregation ability scope.

iv) The UE may receive the MBMS service on any carrier (For instance, a separate MBMS receiver).

In another example, the MBMS service reception ability information reported by the UE may include bits for indicating whether the UE may simultaneously receive the MBMS services on multiple carriers or include bits for indicating number of carriers of the UE for receiving the MBMS services.

In another example, the MBMS service reception ability information reported by the UE may include bits performing the above two indication functions.

As for the MBMS service reception ability information, the minimum coding format may be tried to be used to indicate different reception abilities. For instance, 3 bits information may be taken as an ability indication. The first two bits may indicate carriers used for receiving the MBMS services. The third bit may indicate whether the ability for simultaneously receiving the MBMS services with multiple carriers is possessed or not. For instance, the first two bits 00 may represent that the UE may receive the MBMS service on the Pcell, 01 may represent that the UE may receive the MBMS service on any serving cell, 10 may represent that the UE may receive the MBMS service in the aggregation ability scope and 11 may represent that the UE may receive the MBMS service on any carrier (such as, the separate MBMS receiver). The third bit 1 or 0 may respectively represent that whether the UE may support receiving the MBMS services on multiple carriers in the scope indicated above.

In block 603, the UE in the RRC connection state may report the MBMS service reception state information. The MBMS service reception state may refer to the MBMS service of interest of the UE or the MBMS service, which is being received by the UE.

The MBMS service may be identified by the MBMS frequency point and/or other identifier information (Such as the service ID, service area ID or cell ID) corresponding to the MBMS service.

The reported MBMS service reception state information may follow following rules.

i) The MBMS frequency point in the reported message cannot exceed an MBMS frequency point scope which may be simultaneously received by the UE. For instance, if the UE can receive one MBMS frequency point, the message reported by the UE cannot include two MBMS frequency points.

ii) The priority of each MBMS frequency point may be respectively processed and the priority of each MBMS frequency point may be further configured. Furthermore, when the number of the MBMS frequency points of interest is larger than the number of the MBMS frequency points supported and received by the UE, the UE may not report the MBMS frequency point with the low priority and report the MBMS frequency point with the relatively high priority.

The method for reporting the MBMS service reception state information may follow one of following rules.

iii) The number of the MBMS frequency points of interest may exceed the number of the MBMS frequency points which may be simultaneously supported by the UE. It may be indicated that priorities of the MBMS frequency points of interest of the UE may be ranked from high to low by a ranking order indication, so that the network side may satisfy the requirements of the UE in a descending order.

iv) The number of the MBMS frequency points of interest may exceed the number of the MBMS frequency points which may be simultaneously supported by the UE. The ranking order may not represent any priority relationship. Therefore, any two MBMS frequency points may be received.

The trigger time for reporting the MBMS service reception state information may be the same as that described in embodiment one, which is not repeated here.

Then, the UE may perform subsequent operations, such as re-configuration or returning to the IDLE state, etc. according to the configuration of the eNB.

It should be noted there is no execution order between the above block 602 and 603.

Figure 7:
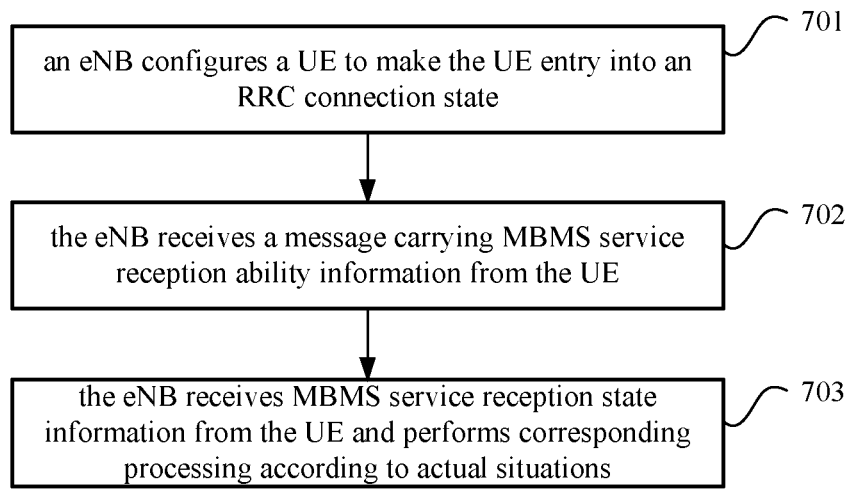
FIG. 7 is a flow chart illustrating an MBMS reception and ability reporting flow of an eNB side in accordance with various embodiments of the present disclosure.

Referring to FIG. 7, FIG. 7 is a flow chart illustrating processing of an eNB side in accordance with various embodiments of the present disclosure. The flow may include following blocks.

In block 701, an eNB may configure a UE to make the UE entry into an RRC connection state. If the UE is already in the RRC connection state, this block may be omitted.

In block 702, the eNB may receive a message carrying MBMS service reception ability information from the UE.

In an example, corresponding to the trigger method for the UE to report the MBMS service reception ability in the flow shown in FIG. 6, the eNB may receive the MBMS service reception ability information sent from the UE. If the eNB triggers the UE to report the MBMS service reception ability information (For instance, via a newly defined eNB query process), corresponding information reported by the UE may be received by the eNB after the eNB triggers the UE to transmit the MBMS service reception ability information.

In block 703, the eNB may receive MBMS service reception state information from the UE and perform corresponding processing according to actual situations.

In an example, the eNB may perform following processing according to specific situations.

i) In a situation that the MBMS service of interest of the UE is within the reception ability scope of the UE, the eNB need to record a reception situation of the UE, so that the reception situation may be used for changing the serving cell to ensure the reception continuity of the MBMS service in the subsequent processing.

ii) If the MBMS service of interest of the UE is beyond the reception ability scope and the serving cell of the UE may be re-configured according to the MBMS service reception ability and an MBMS frequency point load situation of the UE to ensure that the unicast service and the MBMS service may be simultaneously received, the eNB may re-configure the serving cell of the UE and record the information of the MBMS service, which is being received.

iii) If the MBMS service of interest of the UE is beyond the reception ability scope and the eNB cannot configure the serving cell of the UE to simultaneously receive the unicast service and the MBMS service according to the MBMS service reception ability and MBMS frequency point load situation of the UE, the eNB may further determine the priorities of the unicast service and the MBMS service. If the priority of the MBMS service is higher than that of the unicast service, the UE may be released to make the UE return to the IDLE state to receive the MBMS service. If the priority of the unicast service is higher than that of the MBMS service, the current configuration may be maintained and the MBMS service reception situation of the UE may be recorded.

iv) If the number of the MBMS frequency points of interest is larger than one, the eNB may make a configuration to try to satisfy the reception of more MBMS services with the relatively high priority according to a regulation of whether there is a priority indication.

It should be noted that there is no execution order between the above blocks 702 and 703 and the execution order may be determined by a reporting order of the UE side.

Based on the same technical design, an embodiment of the present disclosure may further provide a terminal device and network device applied to the above flow.

Figure 8:
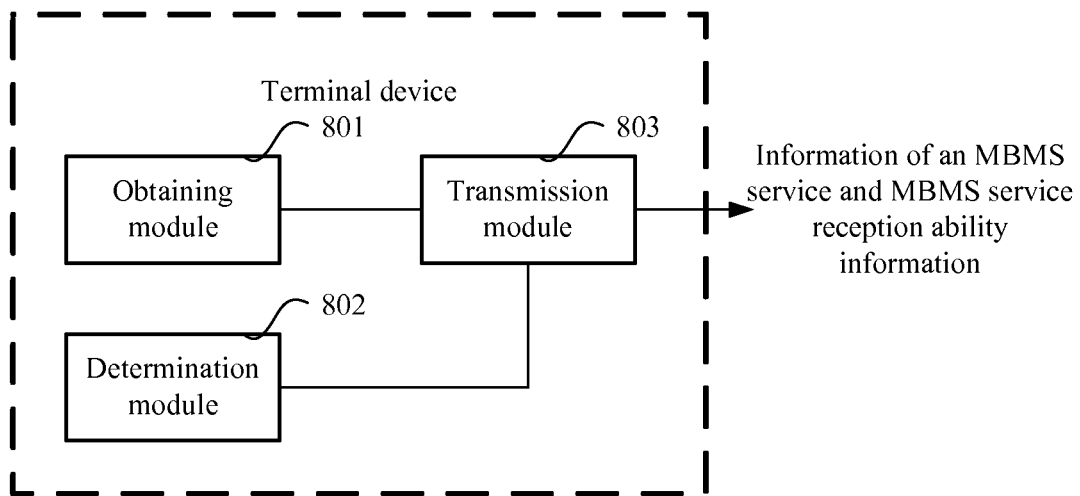
FIG. 8 is a diagram illustrating structure of a terminal device in accordance with various embodiments of the present disclosure.

Referring to FIG. 8, FIG. 8 is a diagram illustrating structure of a terminal device provided by an embodiment of the present disclosure. The terminal device may include:

a transmission module 803, configured to send information of a Multimedia Broadcast Multicast Service (MBMS) service of interest of the terminal device or information of an MBMS service, which is being received, and MBMS service reception ability information of the terminal device to a network device.

Specifically, the transmission module 803 is further configured to report a message to the network device to send the information of the MBMS service and the MBMS service reception ability information to the network device.

If an MBMS frequency point corresponding to an MBMS service of interest of the terminal device or an MBMS frequency point corresponding to the MBMS service, which is being received, is within a reception ability scope of the terminal device in a current configuration, the message reported by the transmission module to the network device may include: the MBMS frequency point to indicate that the terminal device in the current configuration is able to receive the MBMS service on the MBMS frequency point. In another example, the message reported by the terminal device to the network device may include: the MBMS frequency point and a corresponding instruction. The instruction may indicate that the terminal device may receive the MBMS service on the MBMS frequency point in the current configuration.

If the MBMS frequency point corresponding to the MBMS service of interest of the terminal device or the MBMS frequency point corresponding to the MBMS service, which is being received is beyond the reception ability scope of the terminal device in the current configuration, the message reported by the transmission module to the network device may include the MBMS frequency point and the instruction. The instruction may indicate that the terminal device is not able to receive the MBMS service corresponding to MBMS frequency point in the current configuration.

Specifically, the transmission module 803 is further configured to report a message to the network device to send the information of the MBMS service and the MBMS service reception ability information to the network device.

If an MBMS frequency point corresponding to an MBMS service of interest of the terminal device or an MBMS frequency point corresponding to the MBMS service, which is being received, is within a reception ability scope of the terminal device in a current configuration, the message reported by the transmission module to the network device comprises: the MBMS frequency point to indicate that the terminal device in the current configuration is able to receive the MBMS service on the MBMS frequency point.

If the terminal device in the current configuration is not able to receive the MBMS service of interest and is not able to obtain the MBMS frequency point corresponding to the MBMS service, the transmission module is further configured to obtain ID information corresponding to the MBMS service and carry the ID information corresponding to the MBMS service in the message reported to the network device to indicate that the terminal device is not able to receive the MBMS service corresponding to the ID information in the current configuration.

Specifically, the transmission module 803 is further to send the information of the MBMS service and the MBMS service reception ability information to the network device via reporting a message to the network device.

The transmission module is further configured to send a first message carrying the MBMS service reception ability information of the UE in the current configuration and send a second message carrying the information of the MBMS service to the network device.

Specifically, the MBMS service reception ability information transmitted by the transmission module 803 may include a bit for indicating a relationship between a serving cell and an MBMS service reception ability of the terminal device.

Specifically, the MBMS service reception ability information transmitted by the transmission module 803 may include bits for indicating whether the terminal device may simultaneously receive MBMS services on multiple carriers or include bits for indicating number of carriers, on which the terminal device may receive the MBMS services.

When terminal device receives an ability query request sent from the network device, the transmission module 803 is further configured to send a first message to the network device. In another example, when the terminal device reports MBMS service reception state information for the first time after the terminal device enters a connection state, the transmission module 803 is further configured to send the first message. In another example, in a situation that the terminal device reports the MBMS service reception state information after the terminal device is switched to a target cell, the transmission module 803 is further configured to send the first message after the terminal device is switched to a target cell.

Specifically, in the message reported by the transmission module 803, a priority may be configured for the information of the MBMS service.

Specifically, the message reported by the transmission module 803 may include one or multiple pieces of information of the MBMS services. The number of the MBMS frequency points corresponding to the information of the MBMS services is within the scope of the number of the MBMS frequency points which may be simultaneously received by the terminal device.

Specifically, after the terminal device obtains that the user has selectively received the MBMS service transmitted on an air interface, the transmission module 803 is further configured to report the message to the network device after waiting set time from a moment that the user starts to view the selectively-received MBMS service. In another example, after the terminal device obtains that the user is interested in the MBMS service which is to be transmitted on the air interface, the transmission module 803 is further configured to report the message to the network device at a moment, which is set time before a starting moment of the MBMS service.

Specifically, if the terminal device obtains that the user may be interested in the MBMS service, which is to be transmitted on the air interface and the terminal device may receive the MBMS service in the current configuration, set time between the moment that the transmission module 803 reports the message to the network device and the starting moment of the MBMS service is first set time. If the terminal device obtains that the user may be interested in the MBMS service which is to be transmitted on the air interface and the terminal device cannot receive the MBMS service in the current configuration, set time between the moment that the transmission module 803 reports the message to the network device and the starting moment of the MBMS service is second set time. The first set time is less than the second set time.

Furthermore, the terminal device may further include:

an obtaining module 801, configured to obtain the information of the MBMS service of interest of the user or the information of the MBMS service which is being received; and a determination module 802, configured to determine the MBMS service reception ability of the terminal device.

Figure 9:
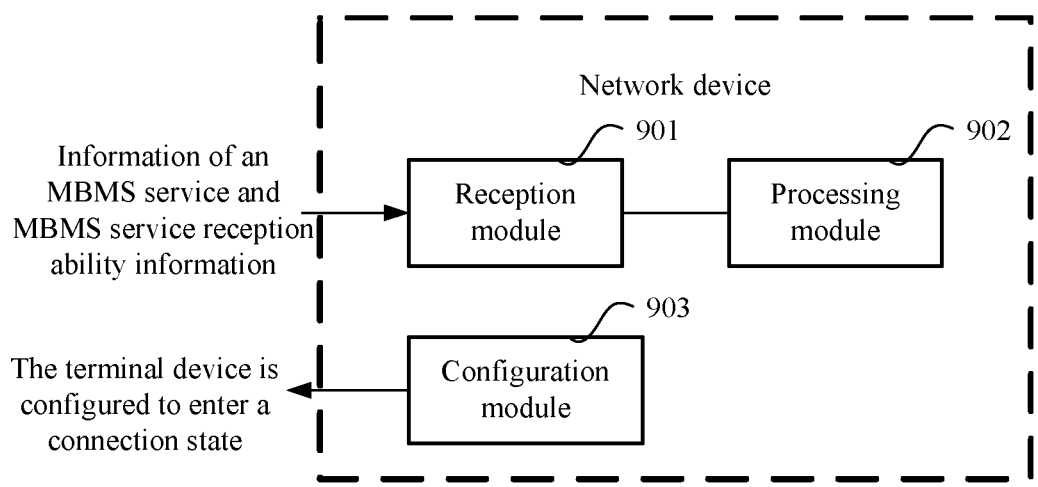
FIG. 9 is a diagram illustrating structure of a network device in accordance with various embodiments of the present disclosure.

Referring to FIG. 9, FIG. 9 is a diagram illustrating structure of a network device in accordance with various embodiments of the present disclosure. The network device may be a base station and the network device may include:

a reception module 901, configured to receive information of an MBMS service of interest of a terminal device or information of an MBMS service, which is being received by the terminal device, and MBMS service reception ability information of the terminal device from the terminal device; and a processing module 902, configured to perform corresponding processing according to the received information of the MBMS service and the MBMS service reception ability information of the terminal device.

If the processing module 902 obtains that the terminal device is able to receive the MBMS service in a current configuration according to the received information of the MBMS service and the MBMS service reception ability information of the terminal device, the processing module 902 is further configured to store the information of the MBMS service reported by the terminal device and consult the stored information of the MBMS service when the network device selects a serving cell for the terminal device.

If the processing module 902 obtains that the terminal device is not able to receive the MBMS service in the current configuration and determines that the terminal device is permitted to change the serving cell according to the received information of the MBMS service and the MBMS service reception ability information of the terminal device, the processing module 902 may re-configure the serving cell for the terminal device to ensure that the terminal device is able to receive the MBMS service and a unicast service, store the information of the MBMS service reported by the terminal device and consult the information of the MBMS service when the serving cell is selected for the terminal device.

If the processing module 902 obtains that the terminal device is not able to receive the MBMS service in the current configuration and determines that the terminal device is not permitted change the serving cell according to the received information of the MBMS service and the MBMS service reception ability information of the terminal device, the processing module 902 may compare a priority of the MBMS service with that of the unicast service reported by the terminal device, release the unicast service of the terminal device and configure the terminal device as an IDLE state to receive the MBMS service if the priority of the MBMS service is larger than the priority of the unicast service and store the information of the MBMS service reported by the terminal device and consult the stored information of the MBMS service when the network device selects the serving cell for the terminal device if the priority of the MBMS service is less than that of the unicast service.

Specifically, when the network device selects the serving cell for the terminal device, the processing module 902 is further configured to select the serving cell according to multiple pieces of information of MBMS services sent from the terminal device to ensure that number of MBMS services received by the terminal device is large and priorities of the MBMS services received by the terminal device are high if there is multiple pieces of the information of the MBMS services and priorities are configured.

Furthermore, the network device may further include a configuration module 903, configured to configure the terminal device in a connection state before the reception module 901 receives the information of the MBMS service and the MBMS service reception ability information of the terminal device.

In summary, embodiments of the present disclosure provide a scheme for reporting the MBMS service reception ability, so that the network side may better distinguish situations of different users and make a reasonable configuration. With embodiments of the present disclosure, whole performances of the system may be ensured and experiences of the user may be enhanced.

It may be understood by a person skilled in the art of the preset disclosure that the modules of the devices in the embodiments may be deployed in the device of the embodiments according to the description of the embodiments and may be deployed in one or multiple devices which are different from those in the present disclosure. The modules in the above embodiments may be combined into one module or split into multiple sub-modules.

With the description of the above embodiments, a person skilled in the art of the present disclosure may clearly know that the present disclosure may be implemented via software and a necessary general hardware platform and may also be implemented via hardware. In some cases, the former is better. Based on such understanding, the technical scheme of the present disclosure or the part of the present disclosure contributing to the conventional method may be a software product. The computer software product may be stored in a storage medium and may include several instructions, with which a terminal device (may be a mobile phone, computer, server or network device, etc.) may execute the above methods in the embodiments of the present disclosure.

The foregoing only describes preferred embodiments of the present invention. The protection scope of the present invention, however, is not limited to the above description. Any change or substitution, easily occurring to those skilled in the art, should be covered by the protection scope of the present invention.

What is claimed is:

1. A Multimedia Broadcast Multicast Service (MBMS) service reception and capability information reporting method, comprising:
   sending, by a terminal device, information of an MBMS service of interest of the terminal device or information of an MBMS service, which is being received by the terminal device, and MBMS service reception capability information of the terminal device to a network device; wherein
   sending, by the terminal device, the information of the MBMS service of interest of the terminal device or the information of the MBMS service, which is being received by the terminal device, and the MBMS service reception capability information of the terminal device to the network device comprises:
   sending, by the terminal device, the information of the MBMS service and the MBMS service reception capability information to the network device via reporting a message to the network device;
   if the MBMS service of interest of the terminal device or the MBMS service, which is being received by the terminal device, is changed, and the terminal device is able to receive the changed MBMS service on a first MBMS frequency, the message reported by the terminal device to the network device comprises: the first MBMS frequency, which is used to indicate that the terminal device is able to receive the MBMS service on the first MBMS frequency;
   or if a new MBMS service of interest is about to start and the terminal device is able to receive the new MBMS service on a second MBMS frequency, the message reported by the terminal device to the network device comprises: the second MBMS frequency, which is used to indicate that the terminal device is able to receive the MBMS service on the second MBMS frequency;
   the MBMS service reception capability information indicates whether the terminal device is able to receive the MBMS service on the MBMS frequency reported by the UE with a current configuration.

2. The method according to claim 1, wherein sending, by the terminal device, the information of the MBMS service and the MBMS service reception capability information to the network device via reporting the message to the network device comprises:
   sending, by the terminal device, a first message to the network device, and the first message carrying the MBMS service reception capability information of the terminal device in the current configuration; and
   sending, by the terminal device, a second message to the network device and the second message carrying the information of the MBMS service.

3. The method according to claim 2, wherein sending, by the terminal device, the first message to the network device comprises:
   sending, by the terminal device, the first message when the terminal device receives a capability query request from the network device;
   sending, by the terminal device, the first message when the terminal device reports MBMS service reception state information for the first time after the terminal device enters a Radio Resource Control (RRC) connection state; or
   sending, by the terminal device, the first message when the terminal device reports the MBMS service reception state information after the terminal device is switched to a target cell.

4. The method according to claim 1, wherein the message comprises a priority configured for the information of the MBMS service.

5. The method according to claim 1, wherein
   the message reported by the terminal device comprises one or multiple pieces of information of MBMS services; and
   number of MBMS frequencies corresponding to the information of the MBMS services is within number of MBMS frequencies received by the terminal device.

6. A Multimedia Broadcast Multicast Service (MBMS) service reception and capability information reception method, comprising:
   receiving, by a network device, information of an MBMS service of interest of a terminal device or information of an MBMS service, which is being received by the terminal device, and MBMS service reception capability information of the terminal device from the terminal device; and
   performing, by the network device, corresponding processing according to the received information of the MBMS service and the MBMS service reception capability information of the terminal device;
wherein receiving, by the network device, the information of the MBMS service of interest of the terminal device or the information of the MBMS service, which is being received by the terminal device, and the MBMS service reception capability information of the terminal device from the terminal device comprises:
receiving, by the network device, the information of the MBMS service and the MBMS service reception capability information from the terminal device via a message;
if the MBMS service of interest of the terminal device or the MBMS service, which is being received by the terminal device, is changed, and the terminal device is able to receive the changed MBMS service on a first MBMS frequency, the message reported by the terminal device to the network device comprises: the first MBMS frequency, which is used to indicate that the terminal device is able to receive the MBMS service on the first MBMS frequency;
or if a new MBMS service of interest is about to start and the terminal device is able to receive the new MBMS service on a second MBMS frequency, the message comprises: the second MBMS frequency, which is used to indicate that the terminal device is able to receive the MBMS service on the second MBMS frequency;
the MBMS service reception capability information indicates whether the terminal device is able to receive the MBMS service on the MBMS frequency reported by the UE with a current configuration.

7. The method according to claim 6, wherein performing, by the network device, the corresponding processing according to the received information of the MBMS service and the MBMS service reception capability information of the terminal device comprises:
storing, by the network device, the information of the MBMS service reported by the terminal device and consulting the stored information of the MBMS service when the network device selects a serving cell for the terminal device if the network device obtains that the terminal device is able to receive the corresponding MBMS service in a current configuration according to the received information of the MBMS service and the MBMS service reception capability information of the terminal device;
re-configuring, by the network device, the serving cell for the terminal device to ensure that the terminal device is able to receive the corresponding MBMS service and a unicast service, storing the information of the MBMS service reported by the terminal device and consulting the stored information of the MBMS service when the terminal device selects the serving cell for the terminal device if the network device obtains that the terminal device is not able to receive the corresponding MBMS service and determines that the terminal device is permitted to change the serving cell according to the received information of the MBMS service and the MBMS service reception capability information of the terminal device; and
comparing a priority of the MBMS service reported by the terminal device with that of the unicast service reported by the terminal device, releasing the unicast service of the terminal device and configuring the terminal device as an IDLE state to receive the MBMS service if the priority of the MBMS service is larger than the priority of the unicast service and storing the information of the MBMS service reported by the terminal device and consulting the stored information of the MBMS service when the network device selects the serving cell for the terminal device if the priority of the terminal device is less than that of the unicast service, if the network device obtains that the terminal device is not able to receive the MBMS service in the current configuration and determines that the serving cell of the terminal device is not permitted to be changed according to the received information of the MBMS service and the MBMS service reception capability information of the terminal device.

8. The method according to claim 7, wherein if there is multiple pieces of information of MBMS services and priorities are configured, the method further comprises:
selecting, by the network device, the serving cell for the terminal device according to the multiple pieces of information of the MBMS services sent from the terminal device; and
the selected serving cell ensures that number of MBMS services received by the terminal device is large and priorities of the MBMS services received by the terminal device are high.

9. The method according to claim 6, wherein before the network device receives the information of the MBMS service and the MBMS service reception capability information of the terminal device, the method further comprises:
configuring the terminal device in a connection state.

10. A terminal device, comprising:
a transmission module, to send information of a Multimedia Broadcast Multicast Service (MBMS) service of interest of the terminal device or information of an MBMS service, which is being received, and MBMS service reception capability information of the terminal device to a network device; wherein
the transmission module is further to report a message to the network device to send the information of the MBMS service and the MBMS service reception capability information to the network device;
if the MBMS service of interest of the terminal device or the MBMS service, which is being received by the terminal device, is changed, and the terminal device is able to receive the changed MBMS service on a first MBMS frequency, the message reported by the terminal device to the network device comprises: the first MBMS frequency, which is used to indicate that the terminal device is able to receive the MBMS service on the first MBMS frequency;
or if a new MBMS service of interest is about to start and the terminal device is able to receive the new MBMS service on a second MBMS frequency, the message reported by the transmission module to the network device comprises: the second MBMS frequency, which is used to indicate that the terminal device is able to receive the MBMS service on the second MBMS frequency;
the MBMS service reception capability information indicates whether the terminal device is able to receive the MBMS service on the MBMS frequency reported by the UE with a current configuration.

11. The terminal device according to claim 10, wherein the transmission module is further to send a first message carrying the MBMS service reception capability information of the UE in the current configuration and send a second message carrying the information of the MBMS service to the network device.

12. The terminal device according to claim 11, wherein
the transmission module is further to send the first message to the network device when the terminal device receives a capability query request sent from the network device; or
the transmission module is further to send the first message when the terminal device reports MBMS service reception state information for the first time after the terminal device enters a connection state; or
the transmission module is further to send the first message when the terminal device reports the MBMS service reception state information after the terminal device is switched to a target cell.

13. A network device, comprising:
a reception module, to receive information of an MBMS service of interest of a terminal device or information of an MBMS service, which is being received by the terminal device, and MBMS service reception capability information of the terminal device from the terminal device; and
a processing module, to perform corresponding processing according to the received information of the MBMS service and the MBMS service reception capability information of the terminal device; wherein
the reception module is further to receive the information of the MBMS service and the MBMS service reception capability information from the terminal device via a message;
if the MBMS service of interest of the terminal device or the MBMS service, which is being received by the terminal device, is changed, and the terminal device is able to receive the changed MBMS service on a first MBMS frequency, the message reported by the terminal device to the network device comprises: the first MBMS frequency, which is used to indicate that the terminal device is able to receive the MBMS service on the first MBMS frequency;
or if a new MBMS service of interest is about to start and the terminal device is able to receive the new MBMS service on a second MBMS frequency, the message comprises: the second MBMS frequency, which is used to indicate that the terminal device is able to receive the MBMS service on the second MBMS frequency;
the MBMS service reception capability information indicates whether the terminal device is able to receive the MBMS service on the MBMS frequency reported by the UE with a current configuration.

14. The network device according to claim 13, the processing module is further to
store the information of the MBMS service reported by the terminal device and consult the stored information of the MBMS service when the network device selects a serving cell for the terminal device if the processing module obtains that the terminal device is able to receive the MBMS service in a current configuration according to the received information of the MBMS service and the MBMS service reception capability information of the terminal device;
re-configure the serving cell for the terminal device to ensure that the terminal device is able to receive the MBMS service and a unicast service, store the information of the MBMS service reported by the terminal device and consult the information of the MBMS service when the serving cell is selected for the terminal device if the processing module obtains that the terminal device is not able to receive the MBMS service in the current configuration and determines that the terminal device is permitted to change the serving cell according to the received information of the MBMS service and the MBMS service reception capability information of the terminal device; and
compare a priority of the MBMS service with that of the unicast service reported by the terminal device, release the unicast service of the terminal device and configure the terminal device as an IDLE state to receive the MBMS service if the priority of the MBMS service is larger than the priority of the unicast service and store the information of the MBMS service reported by the terminal device and consult the stored information of the MBMS service when the network device selects the serving cell for the terminal device if the priority of the MBMS service is less than that of the unicast service if the processing module obtains that the terminal device is not able to receive the MBMS service in the current configuration and determines that the terminal device is not permitted change the serving cell according to the received information of the MBMS service and the MBMS service reception capability information of the terminal device.

15. The network device according to claim 14, wherein the processing module is further to select, when the network device selects the serving cell for the terminal device, the serving cell according to multiple pieces of information of MBMS services sent from the terminal device to ensure that number of MBMS services received by the terminal device is large and priorities of the MBMS services received by the terminal device are high if there is multiple pieces of the information of the MBMS services and priorities are configured.

16. The network according to claim 13, further comprising:
a configuration module, to configure the terminal device in a connection state before the reception module receives the information of the MBMS service and the MBMS service reception capability information of the terminal device.

* * * * *